Jan. 22, 1924.  
J. A. ANGLADA  
1,481,405  
MOTOR MOUNTING AND DRIVING CONNECTION FOR MOTOR VEHICLES  
Filed March 16, 1922  2 Sheets-Sheet 1

INVENTOR  
Joseph A. Anglada  
BY  
C. M. Marshall  
ATTORNEY

Jan. 22, 1924. 1,481,405
J. A. ANGLADA
MOTOR MOUNTING AND DRIVING CONNECTION FOR MOTOR VEHICLES
Filed March 16, 1922 2 Sheets-Sheet 2

INVENTOR
Joseph A. Anglada.
BY
E. W. Marshall
ATTORNEY

Patented Jan. 22, 1924.

1,481,405

UNITED STATES PATENT OFFICE.

JOSEPH A. ANGLADA, OF JENKINTOWN, PENNSYLVANIA.

MOTOR MOUNTING AND DRIVING CONNECTION FOR MOTOR VEHICLES.

Application filed March 16, 1922. Serial No. 544,350.

*To all whom it may concern:*

Be it known that I, JOSEPH A. ANGLADA, a citizen of the United States, and a resident of Jenkintown, county of Montgomery, and State of Pennsylvania, have invented certain new and useful Improvements in Motor Mountings and Driving Connections for Motor Vehicles, of which the following is a specification.

This invention relates to motor vehicles and particularly to vehicles driven by electric motors and to the motor mounting and connections from the motors to the wheel axles and wheels.

In the type of motor vehicle in connection with which the invention has been developed each drive wheel is driven from a separate electric motor.

One of the objects of the invention is to provide a motor mounting and connections between the motors and wheel axles so constructed and arranged as to permit the wheels to move vertically with respect to the frame without interfering with the driving connections.

Another object of the invention is to provide a motor mounting permitting vertical movement of the motors with respect to the frame, and to the rear axle.

Further objects of the invention will appear from the following specification taken in connection with the drawings which form a part of this application and in which—

In the forms of the invention illustrated the motors are independently mounted on and suspended from the vehicle frame and flexible driving connections are provided between each motor and the wheel axle and wheel driven thereby. In certain forms of the invention the motor casing is rigidly suspended and in other forms a resilient suspension is provided.

Figure 1:
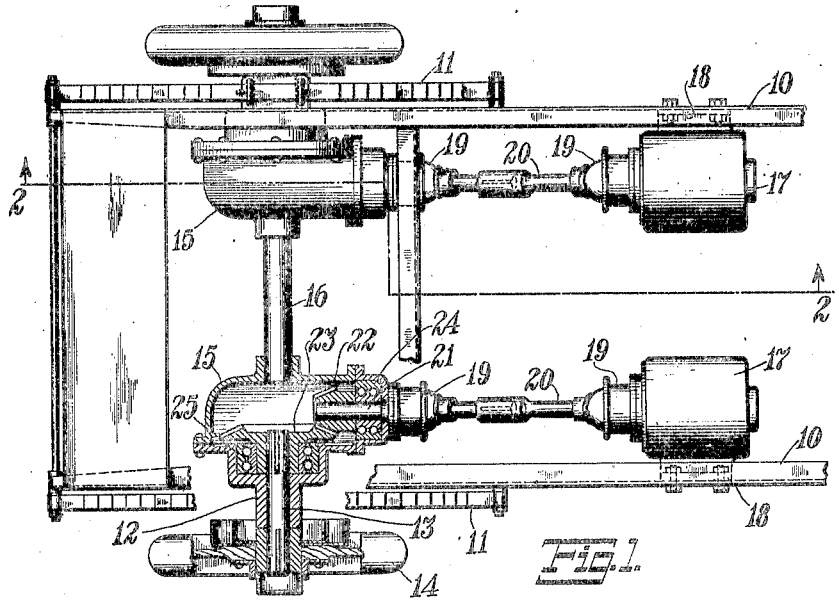
Fig. 1 is a top plan view of the rear end portion of a motor vehicle chassis constructed in accordance with the invention and showing a portion of the rear axle and driving connections in section.
Figure 2:
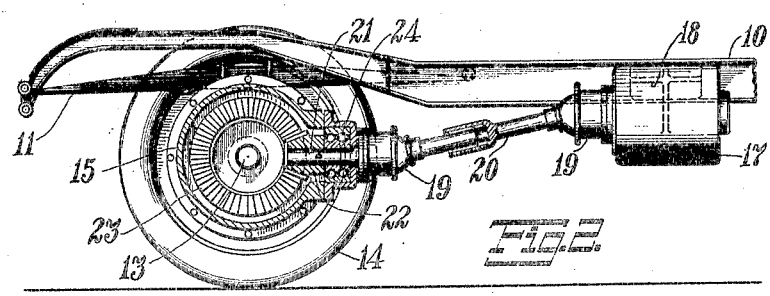
Fig. 2 is a vertical section taken substantially on line 2—2 of Fig. 1.
Figure 3:
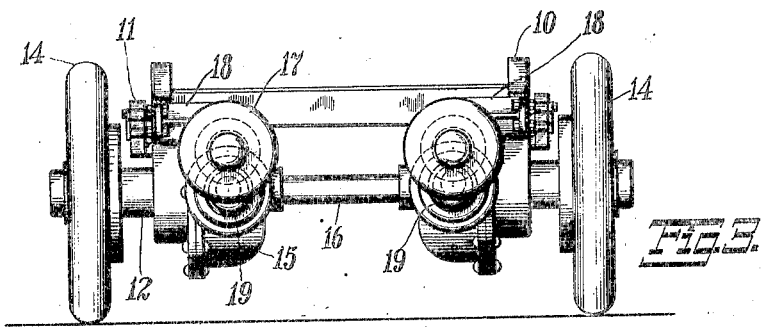
Fig. 3 is a rear elevation of the construction shown in Fig. 1.

Referring first to the embodiment of the invention shown in Figs. 1-3 inclusive, I have shown a portion of the rear end of a motor vehicle chassis having side frame members 10 upon which are mounted springs 11 and to these springs are connected the wheel axle casings 12, housing the wheel axles 13 on the ends of which are mounted the wheels 14.

The rear axle housing comprise the casings 12, gear casings 15 and a connecting member 16 which joins the two gear casings.

In the form of the invention shown in Figs. 1-3 each motor casing 17 is rigidly suspended by a bracket 18 from the side frame member 10.

The driving connections between the motors and the wheel axles comprise a pair of universal joints 19 and connecting shaft 20, shown as a sectional telescopic shaft, the front universal joint 19 being driven by the motor shaft and the rear universal joint driving a shaft 21 which is connected by gearing 22 and 23 to the wheel axle. Suitable bearings 24 and 25 respectively are provided for the shaft 21 and wheel axle 13.

From the above description it will be seen that independent vertical movement of the rear axle with reference to the vehicle frame is permitted without interfering with the driving connections. It will be understood that the propelling effort is transmitted to the vehicle frame through the springs 11 and, if desired, through radius rods.

Figure 4:
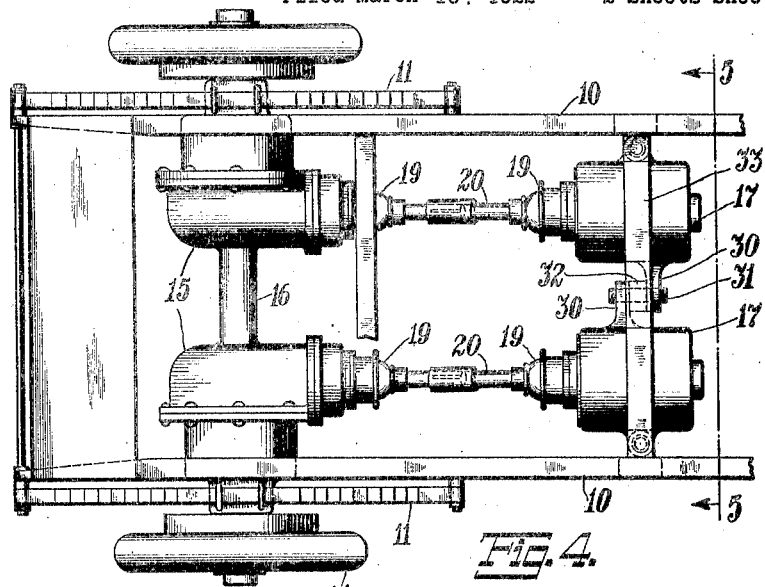
Fig. 4 is a top plan view similar to Fig. 1, but showing another embodiment of the invention.
Figure 5:
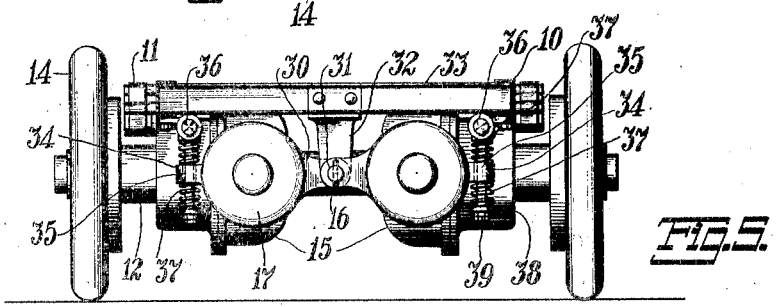
Fig. 5 is a sectional elevation taken substantially on line 5—5 of Fig. 4.

In Figs. 4 and 5 another form of motor mounting is illustrated and in this form each of the motor casings 17 has formed thereon or secured thereto intermediate its ends and on its inner side a laterally or inwardly projecting lug 30. Each of the lugs 30 is pivoted on a common pivot pin 31 carried by a bracket 32 secured to a cross frame member 33.

Each of the casings 17 has also formed on its outer side opposite the lug 30 an outwardly extending lug 34 which is mounted on a rod 35 pivoted in the bracket 36 carried by one of the side frame members 10. A pair of springs 37 is mounted upon each of the rods 35, one spring being disposed on each side of the lug 34 and the bottom spring being supported by a collar or washer 38 adjustable by a nut 39 threaded on to the lower end of the rod 35.

It will thus be seen that in the embodiment of the invention shown in Figs. 4 and 5 each motor casing is pivotally supported at one side and is resiliently supported at its other side, the casings being suspended below the vehicle frame.

Figure 6:
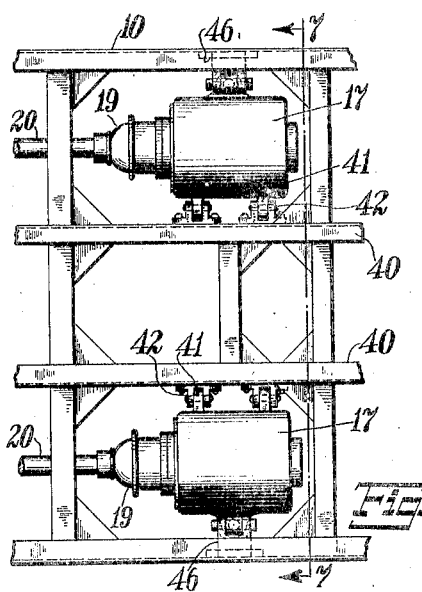
Fig. 6 is a top plan view of a portion of a motor vehicle chassis showing another form of motor mounting.
Figure 7:
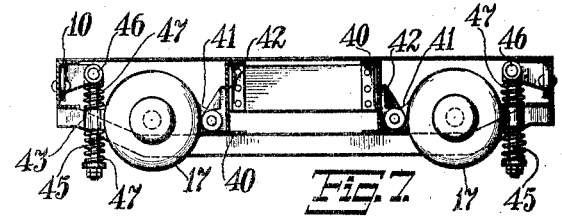
Fig. 7 is a sectional elevation, broken away, taken substantially on line 7—7 of Fig. 6.

The form of the invention shown in Figs. 6 and 7 is similar to that shown in Figs. 4 and 5 but differs therefrom in that the motor casings are not pivoted on a common pivot. In this form of the invention a pair of supplemental longitudinal frame members 30 is mounted on the vehicle frame and each motor casing has formed on its inner portion a pair of lugs 41 pivoted in brackets 42 carried by the supplemental frame members 40. Lugs 43 similar to the lugs 34 in the embodiment of the invention shown in Figs. 4 and 5, are formed on the outer portions of the motor casings and these lugs are mounted on rods 45 pivoted on brackets 46 carried by the frame members 10. Springs 47 are mounted on the rods at each side of each lug 43 and support the motor casing in the manner already described. The last form of the invention described operates in the same manner as that shown in Figs. 4 and 5.

Figure 8:
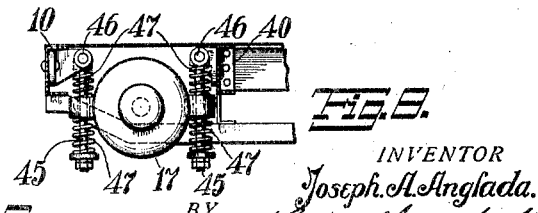
Fig. 8 is a sectional elevation showing another form of motor mounting constructed in accordance with the invention.

In Fig. 8 is shown a full spring suspension mounting for the motor casing wherein the spring supports shown in Fig. 7 are duplicated at both sides of the casing. In view of the similarity of the spring supports in Figs. 7 and 8 the same reference characters are used on both figures.

From the above specification it will be seen that a simple and practical motor suspension and motor connection to the drive wheels has been designed and that the constructions shown will efficiently attain the objects set forth.

Although certain specific embodiments of the invention have been particularly shown and described, it will be undertood that the invention is capable of further modification and that changes in the construction and in the arrangement of the various cooperating parts may be made without departing from the spirit or scope of the invention as expressed in the following claims.

What I claim is:

1. In a motor vehicle, a frame, a pair of drive wheels and wheel axles, and a pair of motors, flexibly connected to drive the wheel axles, each motor having its casing pivoted to the frame at one side of the casing and resiliently supported at its opposite side.

2. In a motor vehicle, a frame, a drive wheel, a motor flexibly connected to drive said wheel, said motor having a casing pivoted at one side to the frame and resiliently supported at its opposite side.

3. In a motor vehicle, a frame, a drive wheel, a motor flexibly connected to drive said wheel, said motor having a casing suspended from and pivoted at one side to the frame and resiliently supported at its opposite side.

4. In a motor vehicle, a frame, a pair of drive wheels and wheel axles, and a pair of motors, flexibly connected to drive the wheel axles, each motor having its casing suspended from and pivoted to the frame at one side of the casing and resiliently supported at its opposite side.

5. In a motor vehicle, a frame, a pair of drive wheels and wheel axles, and a pair of motors, flexibly connected to drive the wheel axles, the motors having their casings pivotally suspended from the frame on a common pivot at the inner portions of the casings and having their casings resiliently suspended from the frame at the outer portions of the casings.

6. In a motor vehicle, a frame having side frame members and supplemental, longitudinal frame members, a pair of drive wheels connected to the frame, and a pair of motors operatively connected to drive said wheels, each motor having one side of its casing pivoted to one frame member and resiliently supported by another frame member.

7. In a motor vehicle, a frame having side frame members and supplemental, longitudinal frame members, a pair of drive wheels connected to the frame, and a pair of motors operatively connected to drive said wheels, each motor having one side of its casing pivoted to one of the supplemental frame members and resiliently supported by one of the side frame members.

In witness whereof, I have hereunto set my hand this 21st day of February, 1922.

JOSEPH A. ANGLADA.